(12) United States Patent
Overhultz et al.

(10) Patent No.: US 9,805,334 B2
(45) Date of Patent: *Oct. 31, 2017

(54) COMPUTER-IMPLEMENTED SYSTEMS AND METHODS FOR PROVIDING AN OUT OF STOCK/LOW STOCK ALERT

(71) Applicant: OSA Acquisition, LLC, Chicago, IL (US)

(72) Inventors: Gary L. Overhultz, River Forest, IL (US); John W. Pyne, Erie, CO (US); Gordon E. Hardman, Boulder, CO (US)

(73) Assignee: SHELFBUCKS, INC., Austin, TX (US)

(*) Notice: Subject to any disclaimer, the term of this patent is extended or adjusted under 35 U.S.C. 154(b) by 563 days.

This patent is subject to a terminal disclaimer.

(21) Appl. No.: 14/473,416

(22) Filed: Aug. 29, 2014

(65) Prior Publication Data

US 2015/0026020 A1 Jan. 22, 2015

Related U.S. Application Data

(63) Continuation of application No. 13/274,419, filed on Oct. 17, 2011, now Pat. No. 8,823,521.

(60) Provisional application No. 61/394,007, filed on Oct. 18, 2010.

(51) Int. Cl.
G06Q 10/08 (2012.01)
G06K 7/10 (2006.01)
A47F 1/12 (2006.01)

(52) U.S. Cl.
CPC .......... *G06Q 10/087* (2013.01); *A47F 1/126* (2013.01); *G06K 7/10366* (2013.01)

(58) Field of Classification Search
None
See application file for complete search history.

(56) References Cited

U.S. PATENT DOCUMENTS

| | | | |
|---|---|---|---|
| 5,912,818 A * | 6/1999 | McGrady | G06M 7/04 700/214 |
| 6,084,511 A | 7/2000 | Kil | |
| 6,752,277 B1 | 6/2004 | Sempliner | |
| 7,061,381 B2 | 6/2006 | Forcier et al. | |
| 7,233,241 B2 | 6/2007 | Overhultz et al. | |
| 7,792,711 B2 | 9/2010 | Swafford, Jr. et al. | |
| 2005/0040123 A1 | 2/2005 | Ali | |
| 2006/0006999 A1 | 1/2006 | Walczyk et al. | |
| 2006/0169659 A1 | 8/2006 | Robinson et al. | |

(Continued)

*Primary Examiner* — Daniell L Negron
(74) *Attorney, Agent, or Firm* — Medley, Behrens & Lewis, LLC

(57) ABSTRACT

Systems and methods are provided for a low stock product display alert system. A system includes a pushing element configured to push one or more products toward a front of a shelf as a unit of the product is removed from the shelf. The system also includes an RFID component, where the RFID component is configured to be in a dormant state when the pushing element is in a first position. The system further includes an activation element configured to activate the RFID component when the pushing element is in a second position, where when activated, the RFID component is configured to emit a signal indicating that the product display is out of product.

22 Claims, 16 Drawing Sheets

(56) References Cited

U.S. PATENT DOCUMENTS

| | | | |
|---|---|---|---|
| 2007/0273513 A1* | 11/2007 | White | G07F 9/026 340/568.8 |
| 2008/0186167 A1 | 8/2008 | Ramachandra | |
| 2009/0114672 A1 | 5/2009 | Schifman et al. | |
| 2009/0248198 A1 | 10/2009 | Siegel et al. | |
| 2011/0055103 A1* | 3/2011 | Swafford, Jr. | A47F 1/126 705/345 |
| 2011/0282768 A1 | 11/2011 | Swafford, Jr. et al. | |

* cited by examiner

COMPUTER-IMPLEMENTED SYSTEMS AND METHODS FOR PROVIDING AN OUT OF STOCK/LOW STOCK ALERT

CROSS REFERENCE TO RELATED APPLICATIONS

This application is a continuation of U.S. patent application Ser. No. 13/274,419, filed Oct. 17, 2011, which in turn claimed priority to U.S. Provisional Patent Application 61/394,007, filed on Oct. 18, 2010, the entirety of both prior applications are herein incorporated by reference.

TECHNICAL FIELD

This document relates generally to product tracking and more specifically to product tracking using RFID components.

BACKGROUND

In retail environments, there are a variety of systems that mechanically move products so that they may be more easily seen and accessed by customers. These may be gravity fed, or have some sort of stored energy, such as a spring, which pushes product to the front of the display; hence these devices are frequently generically referred to as "pushers." Though more expensive than simply depositing product on bare shelves and allowing customers to move items at their discretion, pushers are rapidly cost-justified for certain products by the resulting lift in sales and reduced labor costs associated with restoring order to product that has been "shopped." Retailers are rapidly adopting pusher systems and expanding their use within stores to include more product lines.

SUMMARY

In accordance with the teachings herein, systems and methods are provided for a low stock product display alert system. A system includes a pushing element configured to push one or more products toward the front of a shelf as a united of the product is removed from the shelf. The system also includes an RFID component, where the RFID component is configured to be in a dormant state when the pushing element is in a first position. The system further includes an activation element configured to activate the RFID component when the pushing element is in a second position, where when activated in the second position, the RFID component is configured to emit a signal indicating that the product display is out of product.

As another example, a method of providing a product stock alert includes receiving product in a pusher assembly, where the pusher assembly includes a pushing element configured to push one or more products toward the front of a shelf along a track as a unit of product is removed from the shelf. The method further includes activating an RFID component when the pushing element is in a activate position, where when activated, the RFID component is configured to emit a signal indicating that the pusher assembly is out of product, and where the RFID is inactive when the pusher assembly is in an inactive position.

DETAILED DESCRIPTION

Figure 1:
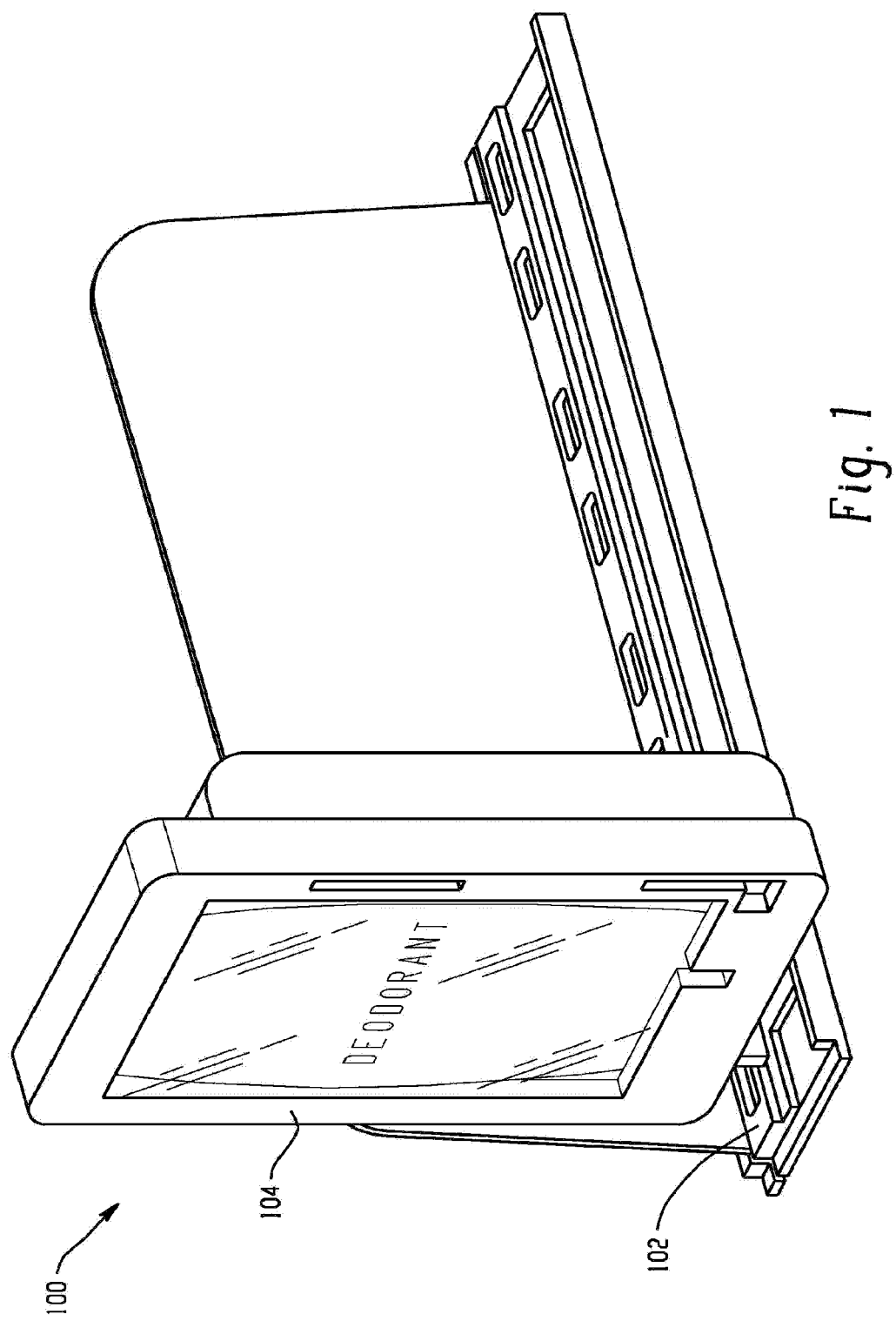
FIG. 1 depicts a pusher assembly.

FIG. 1 depicts a pusher assembly. A pusher assembly 100 (a "pusher") mechanically moves products so that they may be more easily seen and accessed by customers. Pusher assemblies have become very popular mechanisms for displaying products, with over 100 million being deployed worldwide. The pusher assembly 100 depicted in FIG. 1 is configured to hold deodorant products and push the deodorant products towards a front portion 102 of the pusher assembly as units of the product are removed from the pusher assembly. The pushing function of the pusher assembly 100 is provided by a pushing element 104. The pushing element 104 is powered by a spring that stores energy provided when the pusher assembly is loaded with units of the product. When product is added to the pusher assembly, the pushing element 104 is pushed back from the front portion 102 of the pusher assembly. When the pushing element 104 is pushed back along the track, the spring is coiled providing potential energy for pushing product towards the front portion 102 of the pusher assembly 100.

Retailers know that much of the time some fraction of pushers are depleted or void of product, resulting in a shortfall in sales compared to what would have been possible with more ample stock. Some fraction of the empty pushers may be due to re-stocking personnel being unaware that the pushers are empty. Other times, a retail store may run out of product entirely at the store location, such that the empty pushers cannot be refilled. Facilities upstream in the distribution system may have plenty of product to provide the retail store lacking product but have no awareness that the retail store is running out or has run out of product. It is commonly estimated that out-of-stocks (OOS) average around 10%, and fast-moving high-profile products suffer most. When a customer encounters out-of-stock conditions on a product, not only do sales of that item suffer. Many times, the customer will shop elsewhere for that item, so sales of other items the customer would have bought in the original retail store are also lost. If OOS conditions occur too frequently, store loyalty erodes and future business from that customer is forfeited.

Lost sales due to out-of-stocks are estimated in billions of dollars annually. In fast-moving categories where consumers typically purchase multiples of a given item, having only one item on the shelf is almost as consequential. When low stock situations are factored in, the economic motivation to address replenishment deficiencies soars.

Additionally, overstocking can be a similarly costly issue, where capital is tied up in excess inventory and shelf space is suboptimally used, crowding out items that could produce more profit or better fulfill customer needs. A product display alert system may also be used to identify pusher assemblies that are always full or never empty, identifying a potential suboptimal use of shelf space.

The product display alert system also helps identify from which displays (e.g., from a regular aisle, from an endcap display) sales are being made to identify poorly performing displays. It is common for retailers to place stock for a given item in multiple locations throughout the store. In such cases, it is useful to know which locations have the greatest contribution to sales. The monitoring system described herein can address those questions and allow inventory to be better balanced across various locations. This is especially useful if some locations are more expensive to maintain than others (e.g., soda in a cooler is much more expensive to maintain than an open-air gondola or endcap).

Figure 2:
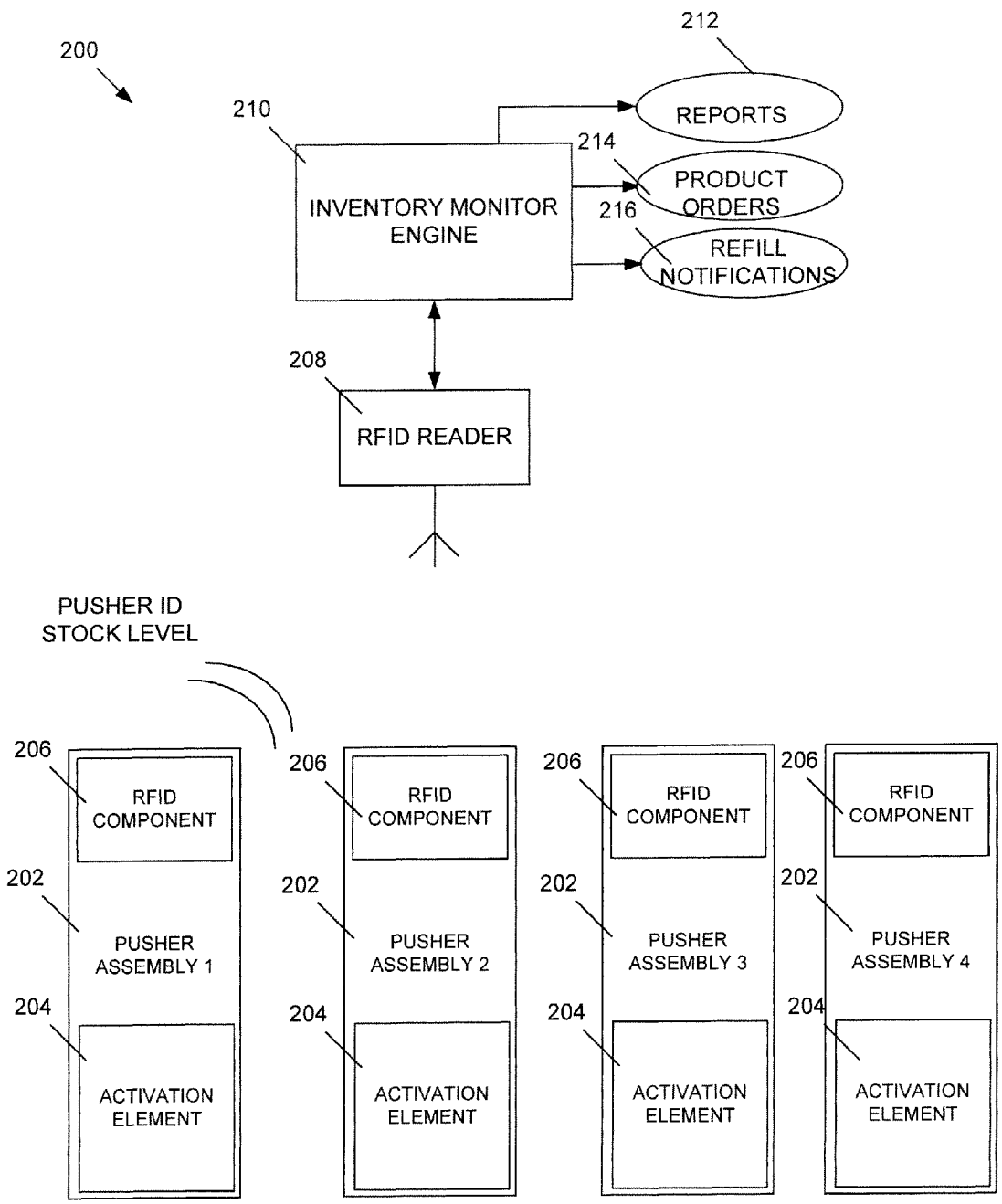
FIG. 2 is a block diagram depicting a low stock product display alert system.

FIG. 2 is a block diagram depicting a low stock product display alert system. A number of pusher assemblies 202 are positioned within an area, such as on shelves in a retail store. Each of the pusher assemblies includes an activation element 204 that monitors an amount of product present within the pusher assembly. The activation element 204 provides a signal to a radio frequency identification (RFID) component 206 that transmits product inventory data, such as a pusher assembly identification and a stock level to an RFID reader 208 in communication with an inventory monitor engine 210.

The inventory monitor engine 210 tracks inventory data received from the pusher assemblies 202 and may use the received data for a variety of purposes including generating inventory reports 212, product orders 214, and refill notifications 216. Reports 212 may be used by management to analyze an amount of inventory held, such as at a retail store location. Too much inventory held is detrimental to profitability of a company, while too little inventory results in OOS conditions that can also be detrimental. Thus, proper inventory management can be a key player in company success. The inventory monitor engine 210 may also be configured to automatically order product when inventory of that product has run out or is low at a location. Such a feature may be especially valuable in a retail store having a large number (e.g., thousands) of stock keeping units (SKUs), where individual monitoring of SKU inventory levels by a human becomes substantially burdensome. The inventory monitor engine 210 may also be configured to provide refill notifications 216 that identify a pusher assembly 202 that is running low on or has run out of product. Such refill notifications 216 may be provided to appropriate personnel to ensure fast product refills, minimizing OOS conditions.

The activation element 204 may operate in a variety of manners. For example, the activation element 204 may operate in an on-off fashion based on whether any product is present within the pusher assembly. When no product is present in the pusher assembly 202, the activation element 204 may activate the RFID component 206, instructing the RFID component 206 to transmit a pusher identification associated with that pusher assembly 202, notifying the inventory monitor engine 210 that the pusher assembly 202 is empty.

The activation element 204 may also operate on a more refined scale, where one or more additional inventory levels of the pusher assembly 202 are tracked. For example, the pusher activation element 204 may direct the RFID component 206 to transmit a pusher identification and stock level value to the inventory monitor engine when the pusher assembly 202 is 75%, 50%, 25% and 0% full. An activation element 204 may track other product levels as well, in some implementations tracking and directing transmission of an exact amount of product present in the pusher assembly.

Figure 3:
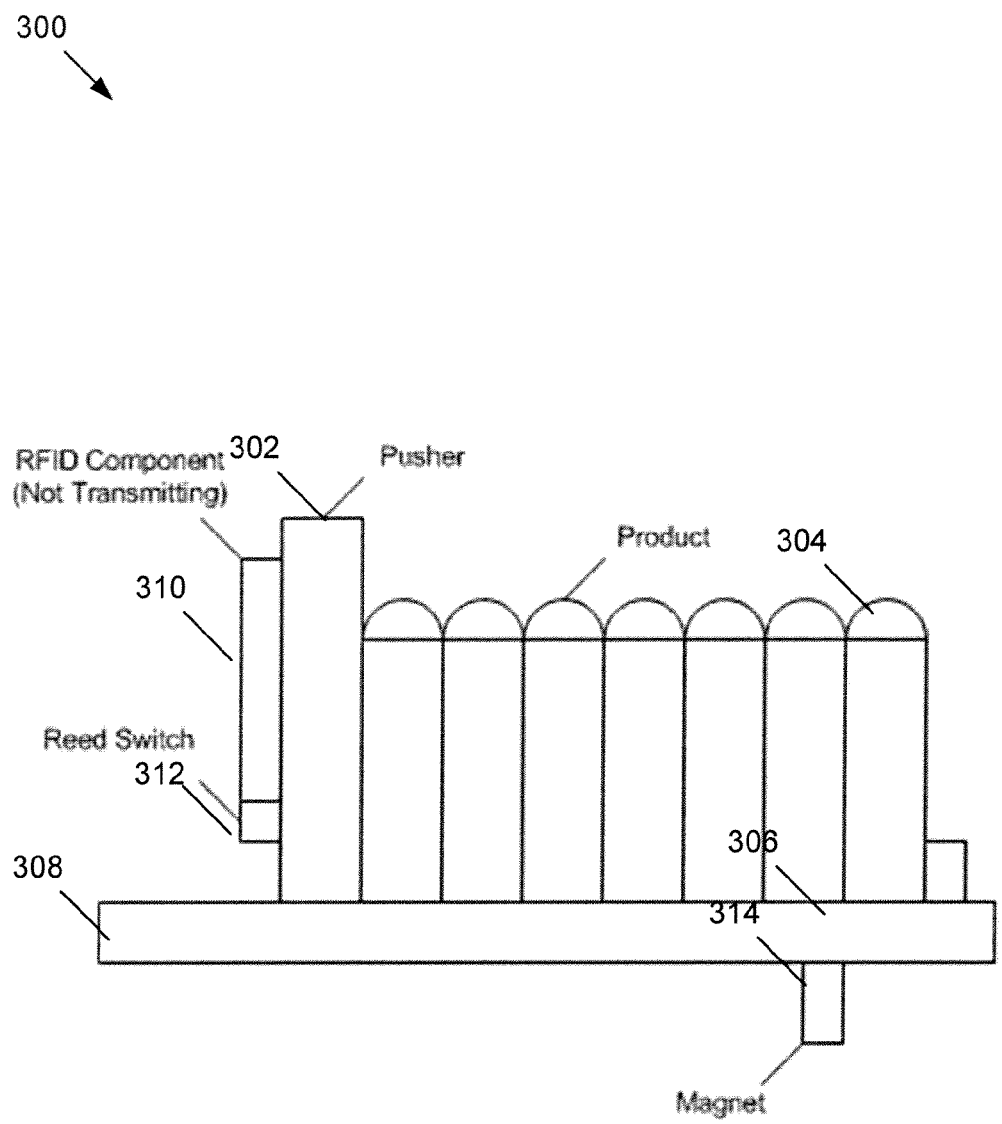
FIG. 3 is a diagram of a low stock product display alert system in the form of a pusher assembly.

FIG. 3 is a diagram of a low stock product display alert system in the form of a pusher assembly. The pusher assembly includes a pushing element 302 configured to push units of product 304 toward a front portion 306 of a shelf along a track 308 as units of the product 304 are removed from the shelf. An RFID component 310 is attached to the back of the pushing element 302. The RFID component 310 is activated by the closing of a magnetic reed switch 312 that is also attached to the back of the pushing element 302. The depiction of FIG. 3 shows the pushing element in a first position, where the RFID is in a dormant state based on the open circuit created by the reed switch. The magnetic reed switch 312 is closed and the RFID component 310 is activated when the pushing element 302 is in a second position in an empty pusher assembly, where the magnetic reed switch 312 is aligned over a magnet 314.

Figure 4:
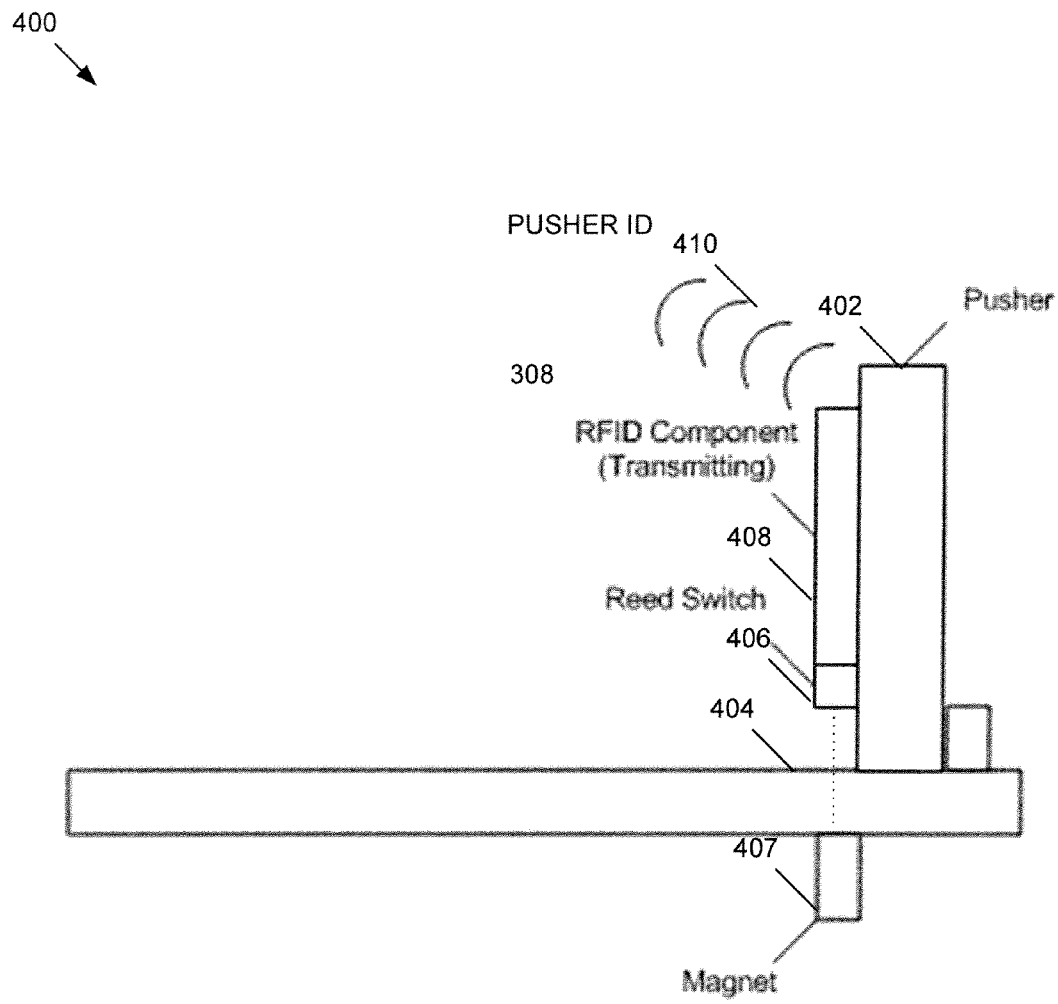
FIG. 4 is a diagram depicting a pusher assembly that contains no units of product.

FIG. 4 is a diagram depicting a pusher assembly that contains no units of product. In FIG. 4, a pushing element 402 has reached the front portion 404 of the pusher assembly, where all units of the product have been removed from the pusher assembly. Upon reaching the second position, the reed switch 406 and the magnet 407 are aligned, such that the reed switch 406 is closed. The closed reed switch 406 activates the RFID component 408 to transmit an out of stock signal 410 to an RFID reader. The transmitted signal 410 may include an identifier value of the pusher assembly so that an inventory monitor engine can track which pusher assembly is empty and react appropriately. The transmitted signal 410 may include an indicator identifying that the pusher is out of product, or such an indication may be understood without the indicator based on the on-off nature of the depicted pusher assembly configuration.

The RFID component 408 may be configured to transmit data according to a number of protocols. For example, the RFID component 408 may be configured to transmit a signal only when the reed switch 406 is closed, identifying that the pusher assembly is out of product. The RFID component 408 may transmit such an out of stock signal one time, multiple times, or periodically until the pusher assembly is refilled.

Such a configuration may offer extensive battery life. For example, the reed switch 406 may disconnect the RFID component 408 from a battery when in an open state. Thus, the RFID component 408 is only active and transmitting when the pusher assembly is out of product. Alternatively, the RFID component 408 may periodically transmit a stock amount for the pusher assembly, transitioning to an out of stock amount when the reed switch 406 and the magnet are aligned. In addition to a stock amount, an RFID component 408 may transmit a counter value that identifies a period of time that the RFID component has been transmitting (e.g., a period of time during which a pusher assembly is out of stock). As another alternative, the RFID component 408 may be a passive tag that transmits in response to a received polling signal, wherein the contents of the response are based on the position of the pushing element 402.

The RFID component 408 may be implemented in a variety of forms. For example, the RFID component 408 may be a passive tag (e.g., Higgs or Monza EPC tags provided by Alien Technologies or Impinj, respectively), a battery assisted tag (e.g., PowerID's Power G tags or Goliath Solution's beacon backscatter tag), or an active tag (e.g., those commercially available through GAORFID or Verayo or using basic chipsets such as those provided by Microchip, Raflatac, and Texas Instruments).

Figure 5:
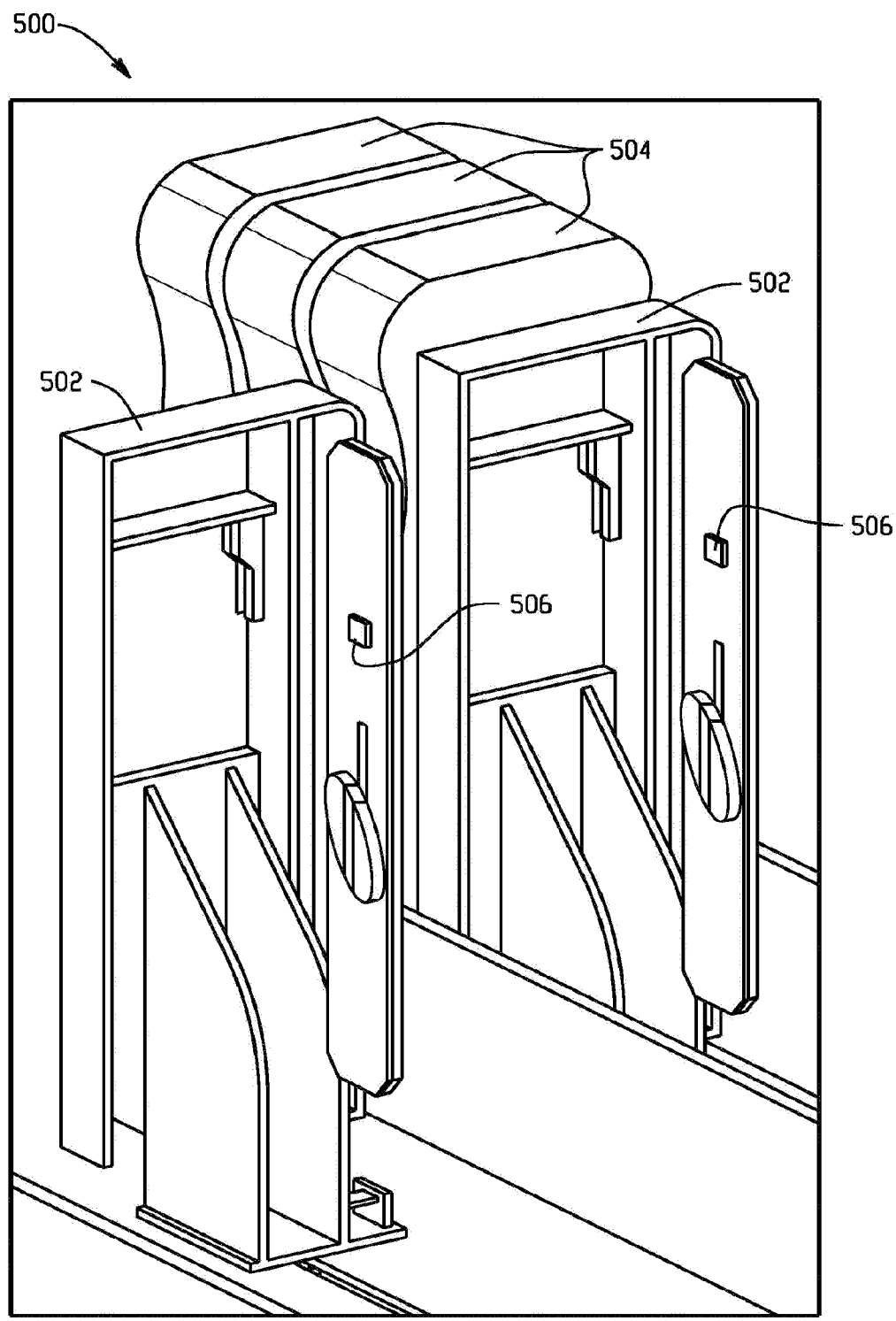
FIG. 5 depicts a back view of pusher assembly having a pushing element with an RFID component attached.

FIG. 5 depicts a back view of pusher assembly having a pushing element with an RFID component attached. The pushing element 502 pushes products 504 toward the front of a shelf as units of the product are removed from the shelf. An RFID component 506 is attached to the back of the pushing element 502. One or more activation elements are configured to activate the RFID component 506 when the pushing element reaches a second position when no units of the product 504 are present in the pusher assembly.

Figure 6:
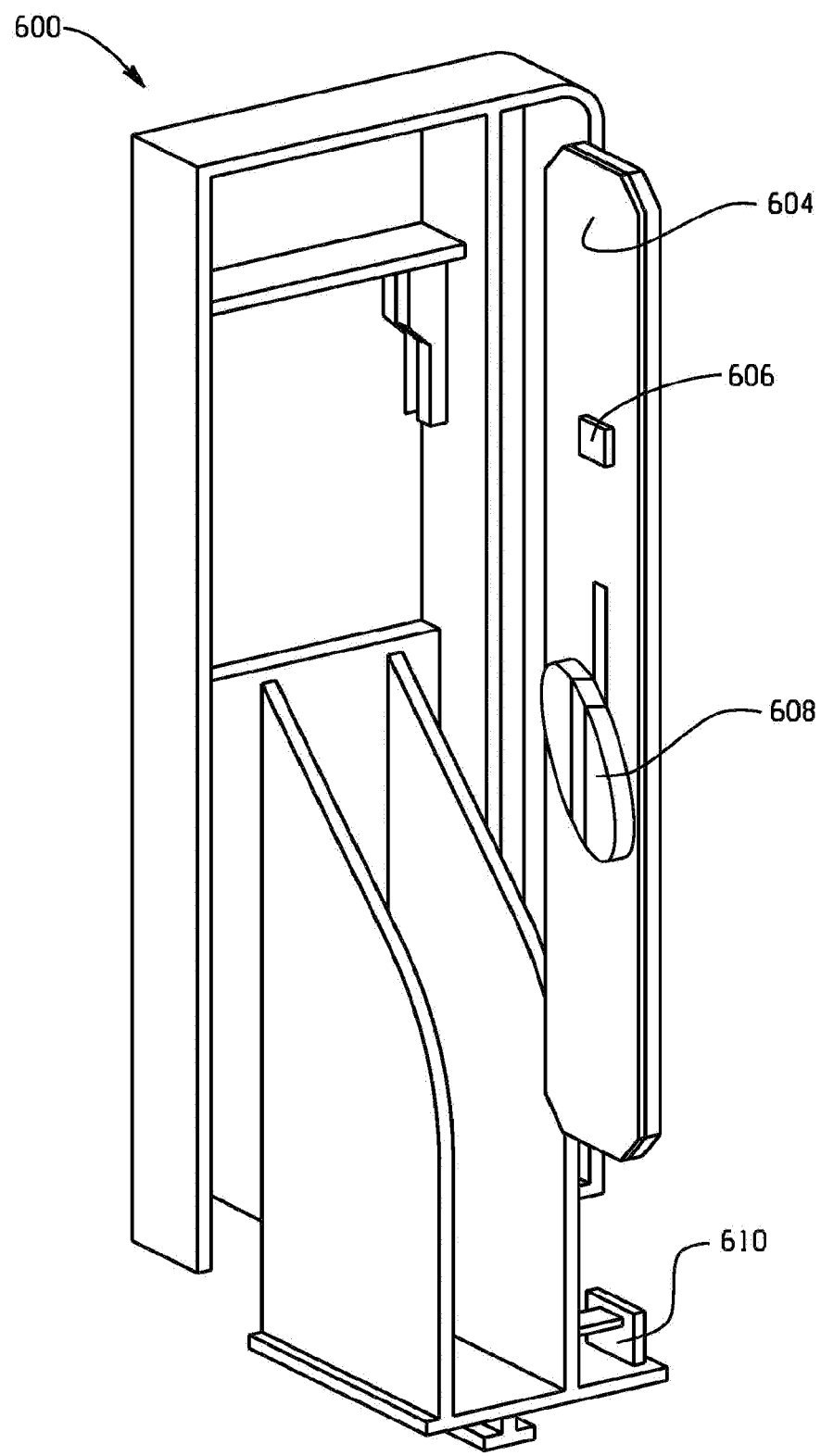
FIG. 6 depicts a pushing element having an attached RFID component and reed switch activation element.

FIG. 6 depicts a pushing element having an attached RFID component and reed switch activation element. A pushing element 602 is shown detached from a track and other elements of a pusher assembly. An RFID component 604 is attached to the back of the pushing element 602. The RFID component includes an RFID tag 606 that is configured to emit a signal indicating that a product display is out of product or other product inventory information. The RFID tag 606 is powered by a battery 608. The RFID component is controlled via a magnetic reed switch 610 that maintains or disconnects a connection between the RFID tag 606 and the battery 608. When the magnetic reed switch 610 is closed, such as when the magnetic reed switch 610 is aligned with a magnet, the connection between the RFID tag 606 and battery 608 is made so that the RFID tag can transmit inventory information and otherwise function. When the reed switch 610 is open, the connection between the RFID tag 606 and the battery 608 is broken, such that the RFID tag 606 is unable to transmit inventory information, and the RFID tag 606 resides in a dormant state.

Figure 7:
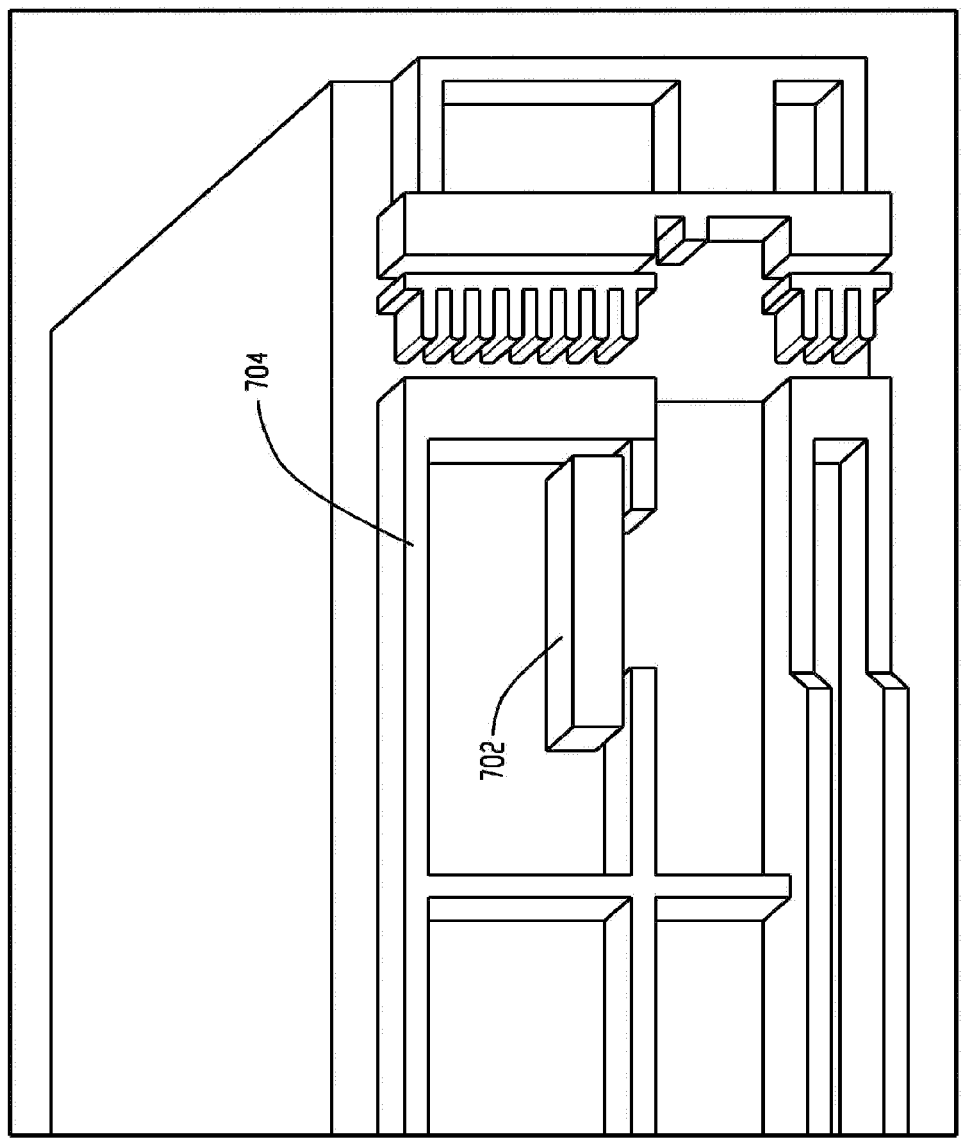
FIG. 7 depicts a bottom view of a pusher assembly track.

FIG. 7 depicts a bottom view of a pusher assembly track. A magnet 702 is affixed to the bottom of the track at a front portion 704 of the pusher assembly. The magnet 702 activates an RFID component to transmit inventory information to an inventory monitor engine. For example, the magnet 702 may close a reed switch when the reed switch is aligned over the magnet 702, in turn connecting a battery to an RFID tag of the RFID component activating the RFID tag to transmit inventory data. To speed installation, the magnet 702 may be affixed to the top or side of a track 704. In such cases, inventory would not have to be removed for installation.

Figure 8:
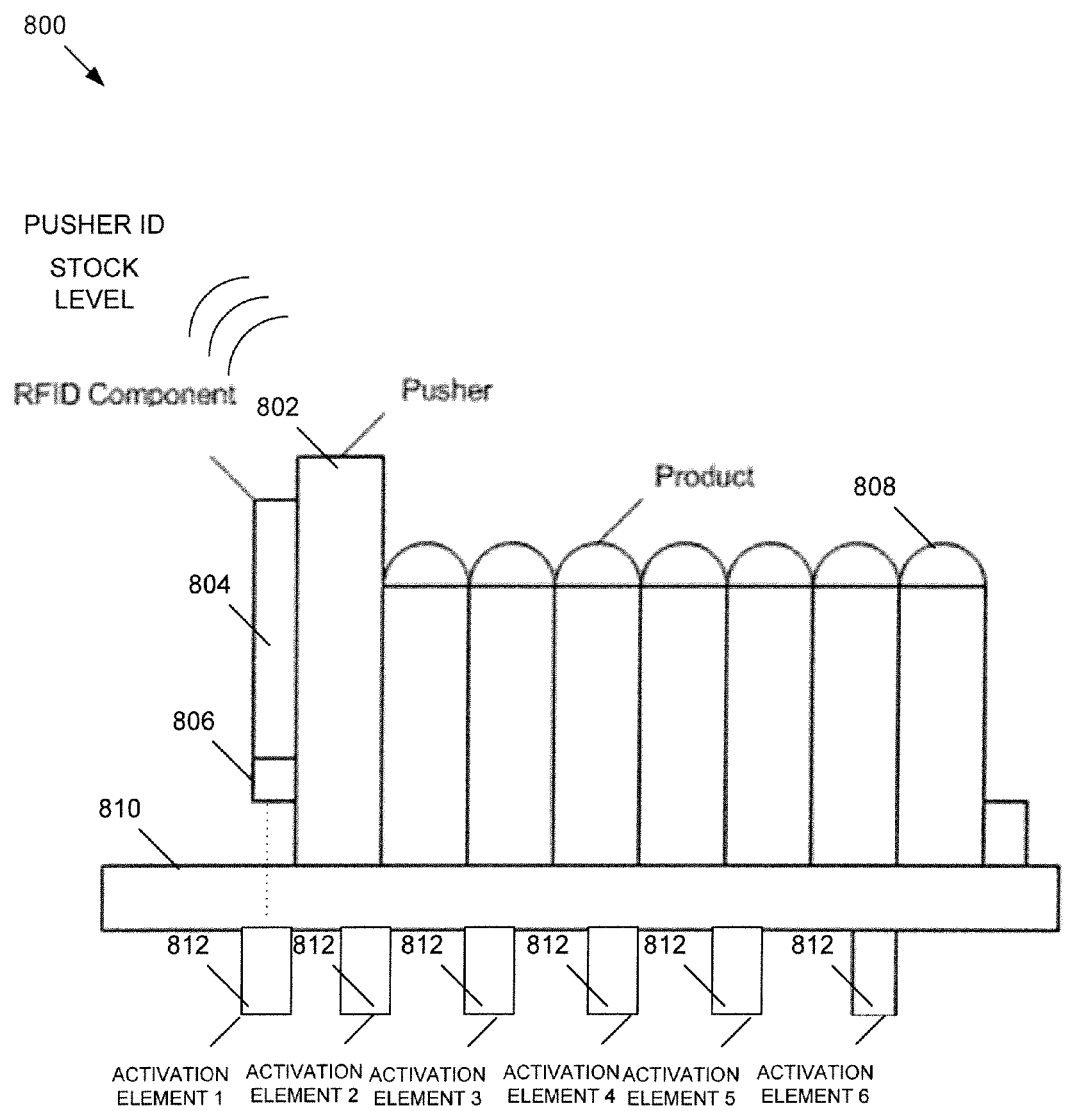
FIG. 8 is a diagram depicting a low stock product display alert system in the form of a pusher assembly having multiple activation elements.

FIG. 8 is a diagram depicting a low stock product display alert system in the form of a pusher assembly having multiple activation elements. The pusher assembly includes a pushing element 802 that carries an RFID component 804 and a magnetic reed switch activation element 806. The pushing element 802 pushes units of product 808 along a track 810 as units of the product 808 are removed from the pusher assembly.

The pusher assembly of FIG. 8 includes a number of activation elements 812 in the form of magnets configured to interact with the magnetic reed switch 806 and activate the RFID component 804. The multiple activation elements 812 can enable the RFID component 804 to transmit inventory information to an inventory monitor engine at a higher degree of resolution than certain single activation element configurations described above. In the example of FIG. 8, each of the activation elements 812 is associated with a different level of inventory in the pusher assembly. When the magnetic reed switch 806 is aligned over a particular activation element, the reed switch 806 is closed to a particular position associated with that activation element (e.g., different strength magnets may be associated with different activation elements, activating the reed switch 806 to a particular state). Based on the state of activation of the reed switch 806, the RFID component is commanded to transmit a pusher assembly identifier and an associated stock level to the inventory monitor engine.

The multiple activation element configuration of FIG. 8 can provide stock level data at a variety of resolutions. For example, the RFID component may be directed to transmit data when the pusher assembly is half full, one quarter full, and empty. In another example, the activation elements 812 may be set at a single product unit resolution, such that the RFID component 804 transmits a signal that can be associated with an exact or approximate count of the number of units of product 808 in the pusher assembly.

Figure 9:
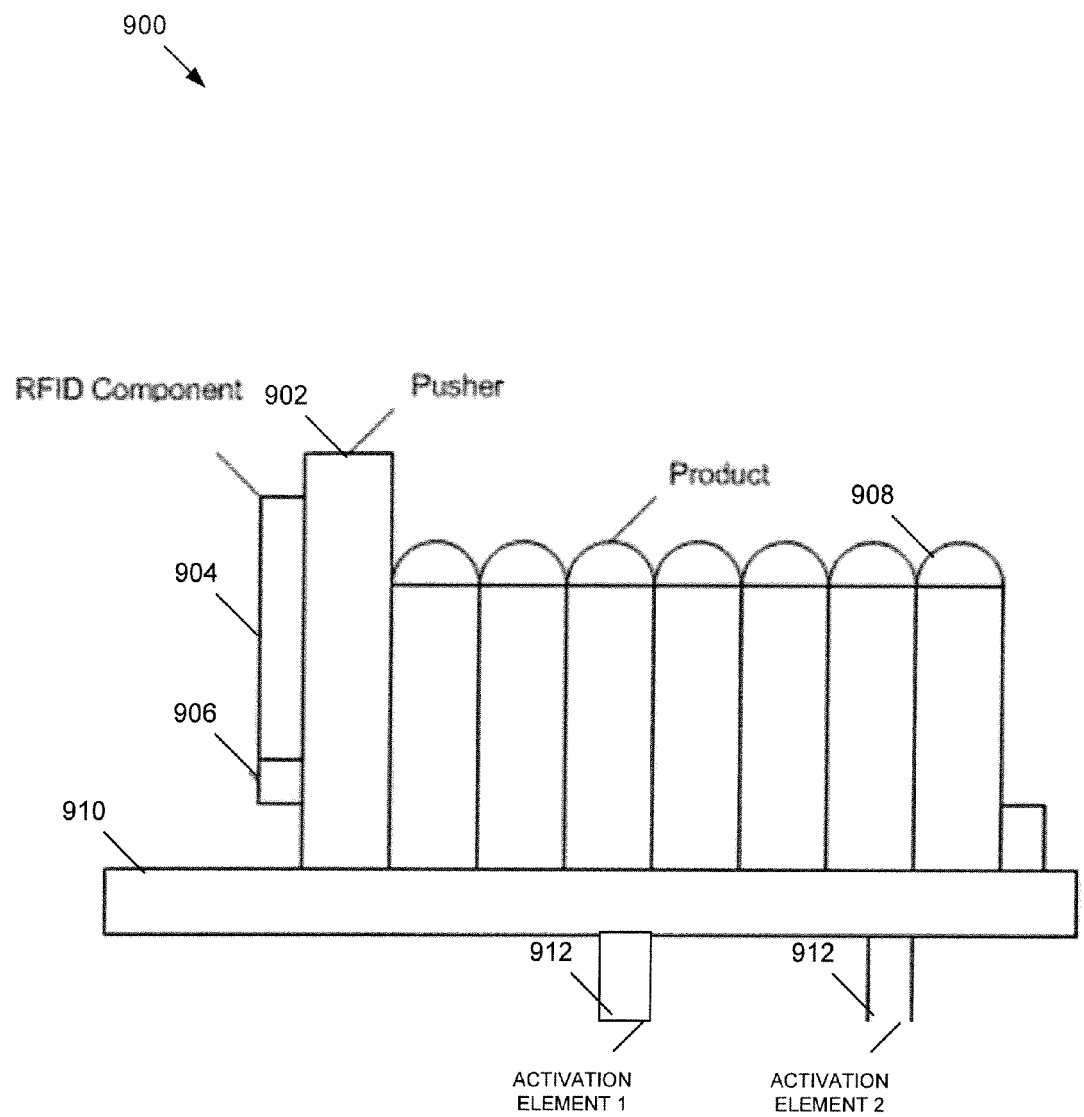
FIG. 9 is a diagram depicting a low stock product display alert system in the form of a pusher assembly having multiple activation elements for detecting half full and empty pusher assembly states.

FIG. 9 is a diagram depicting a low stock product display alert system in the form of a pusher assembly having multiple activation elements for detecting half full and empty pusher assembly states. The pusher assembly includes a pushing element 902 that carries an RFID component 904 and a magnetic reed switch activation element 906. The pushing element 902 pushes units of product 908 along a track 910 as units of the product 908 are removed from the pusher assembly.

The pusher assembly of FIG. 9 includes two activation elements 912 configured to interact with the magnetic reed switch 906 to activate the RFID component 904. The activation elements 912 are positioned to activate the RFID component 904 when the pusher assembly is half full and empty. When activated, the RFID component may broadcast a pusher assembly identification signal as well as a stock level (e.g., half full or empty). Alternatively, a pusher identification signal may be transmitted alone, where the inventory monitor engine recognizes the pusher assembly as half full upon receipt of a first signal from the pusher assembly and empty upon receipt of a second signal from the pusher assembly.

Configurations, such as that of FIGS. 8 and 9, that can track stock levels at more than an empty/full resolution can be useful in applications beyond product unit refilling. For example, a product display alert system may also or alternatively provide theft monitoring services. There is typically a trade-off between securing expensive merchandise against theft and making it accessible to honest customers to facilitate sales. One consequential loss occurs when a thief "sweeps" all the remaining merchandise into a container that is shielded to make detection of the items difficult (e.g., a foil-lined bag that defeats RF-based detection at store exits). A detection of a single pusher assembly going rapidly from a large-stock reading to an out-of-stock condition across the various activation element trigger points provides an alert to store management that a possible theft is in progress. If thieves can be detected/confronted before they leave the store, then the probability of sweeps declines.

As another example, a theft-reduction system could allow customers to open a door to get merchandise. When the door is opened, a switch activates a proximal speaker system that announces the door is opened, and if it remains open beyond a certain period, the speaker advises that it has been left open longer than expected. In one configuration, that switch also enables a tag to be transmit, sending an alert to store personnel who may be unable to hear the audible warning. (e.g., a vibrating pager that is held by either a manager or a security guard).

As another example, one of the activation element trigger points may be configured to detect unscrupulous consumer behavior. Among the trigger points on a pusher assembly that may be set with a monitoring trigger is the "locked" (i.e., fully cocked) position often used during restocking. When a pusher remains in that position beyond a certain period of time, an alert is generated to indicate that a thief may be trying to defeat the system by securing the pusher in the locked position. During legitimate restocking periods, personnel can disable the "lock" alerts through software that automatically resumes monitoring after a certain period.

Figure 10:
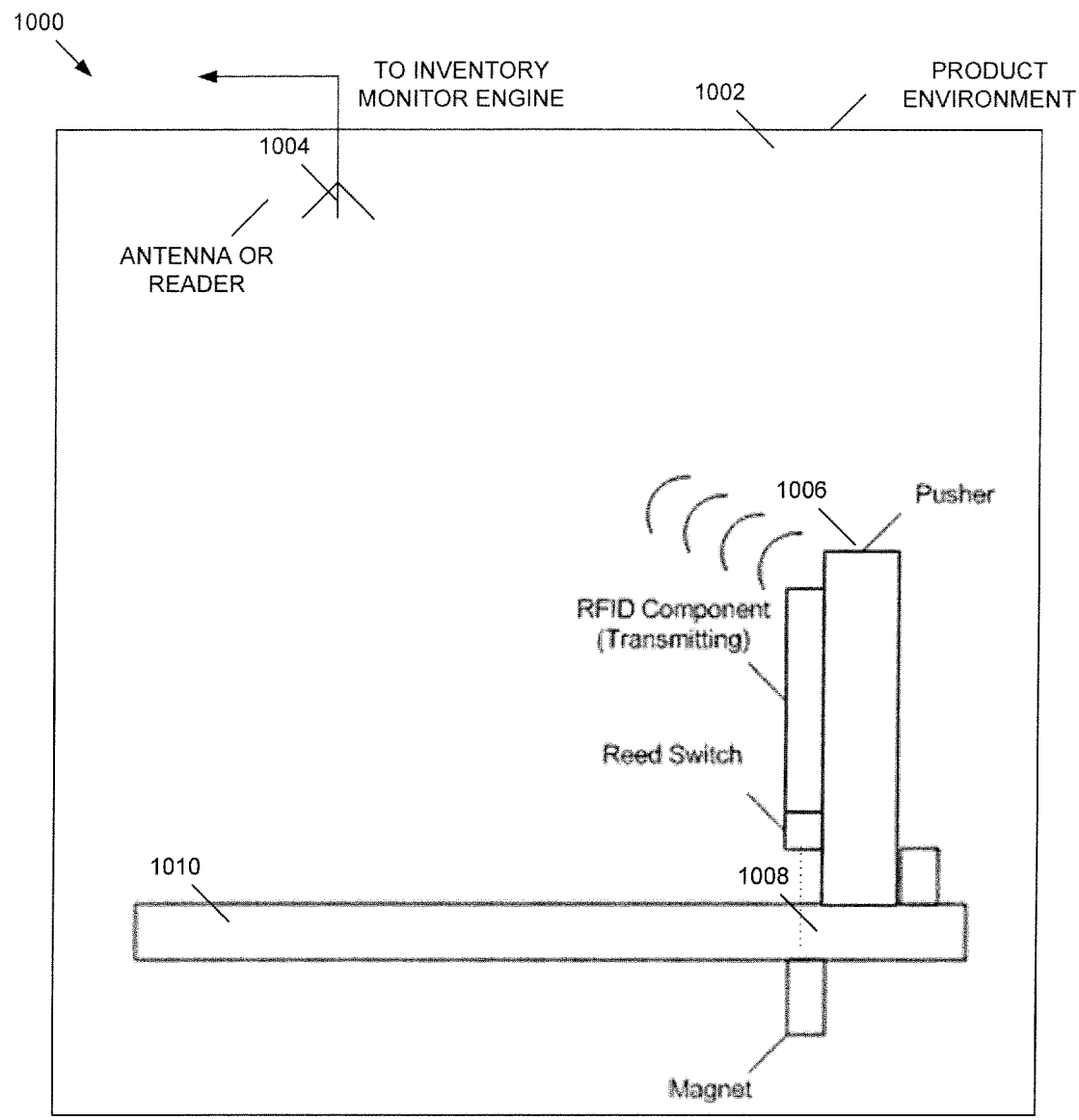
FIG. 10 depicts a pusher assembly positioned on a shelf within a product environment.

In addition to the embodiments described above, a product display alert system may be implemented in a variety of other forms and configurations. FIG. 10 depicts a pusher assembly positioned on a shelf within a product environment. Certain product environments may offer challenges in propagating RFID signals. For example, a product display alert system may be placed within a refrigerator or freezer case, where RFID signals transmitted within the product environment 1002 may be difficult to detect outside of the product environment 1002. The configuration of FIG. 10 addresses this concern by including an antenna or reader 1004 within the product environment 1002, such that metal sides, liquid in products, or other interference agents provided by the product environment 1002 are mitigated. The pusher assembly transmits a signal (e.g., an out of stock signal when a pushing element 1006 reaches a front portion 1008 of the pusher assembly track 1010). The signal is received by the antenna or reader 1004 and transmitted to the inventory monitor engine (e.g., via a wired coaxial connection or via a wireless connection having a transmitting antenna) outside of the product environment.

Figure 11:
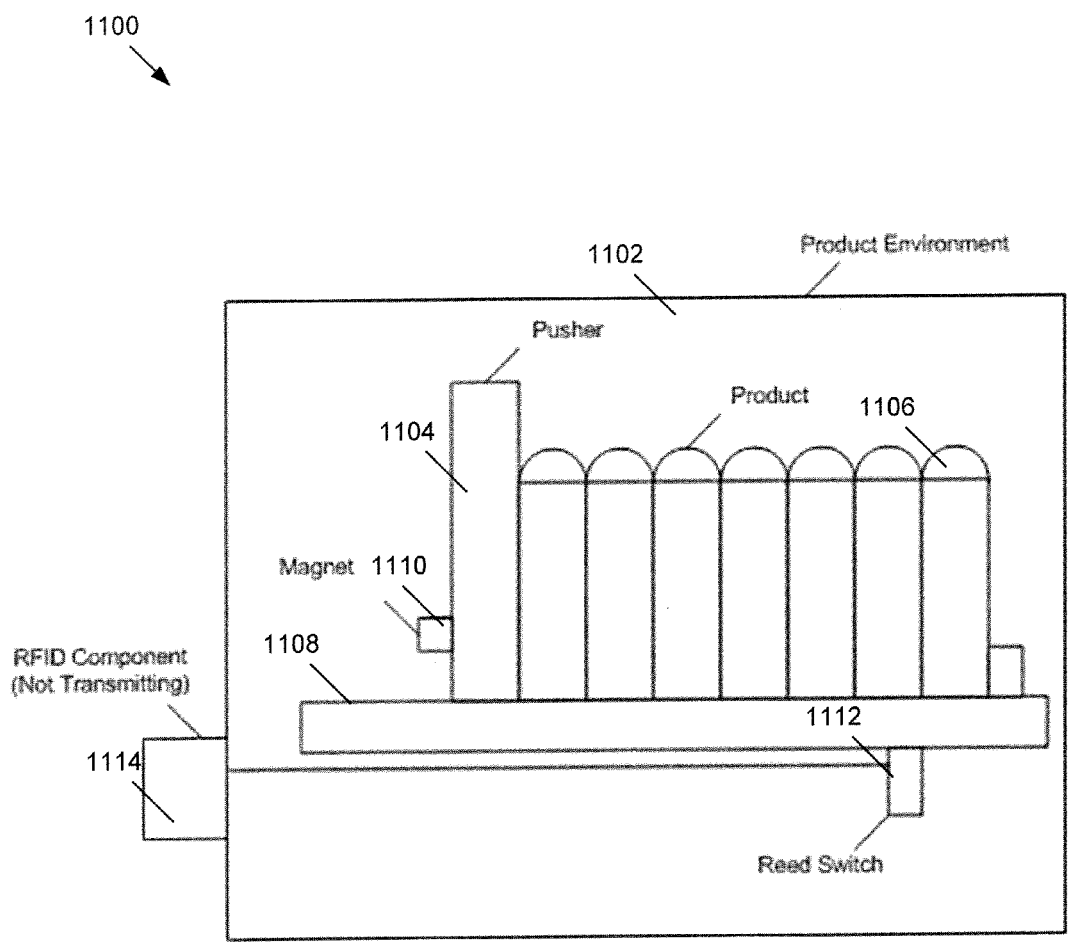
FIGS. 11 and 12 depict an example embodiment for operating a product display alert system in a product environment.
Figure 12:
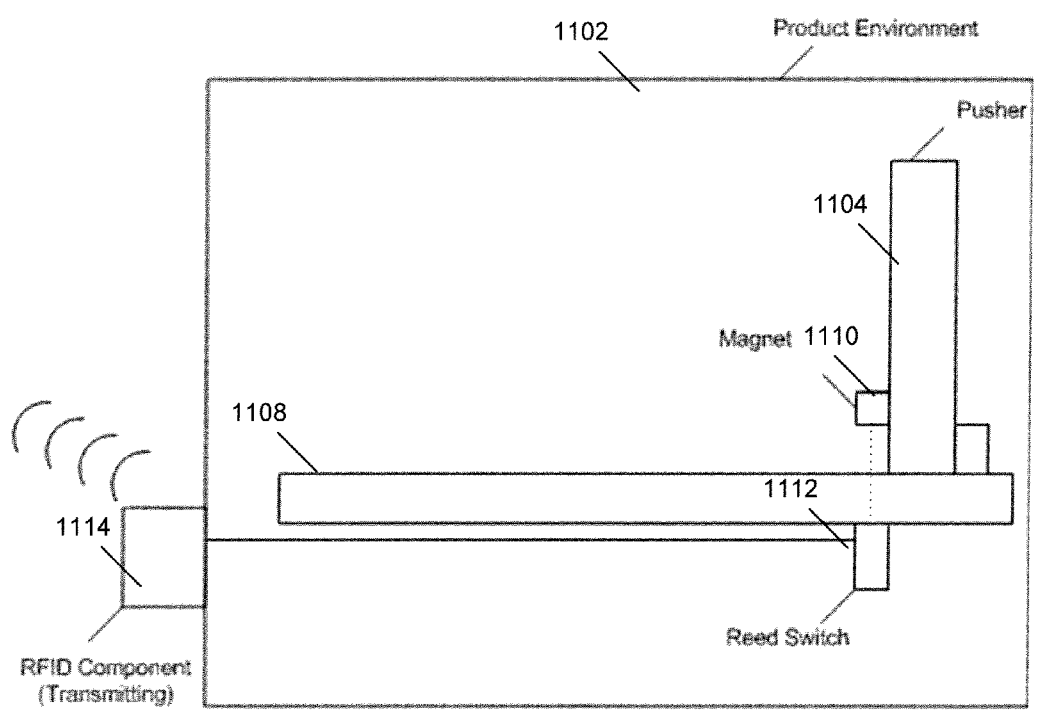

FIGS. 11 and 12 depict another example embodiment for operating a product display alert system in a product environment. As noted with respect to FIG. 10, certain product environments offer challenges to RFID tracking systems. FIGS. 11 and 12 offer another example solution to those challenges. In this example, a pusher assembly located within a product environment 1102 includes a pushing element 1104 configured to push units of product 1106 toward the front of a shelf along a track 1108. A magnet 1110 is attached to the back of the pushing element 1104 and functions as an activation element. A reed switch 1112 is attached to the bottom, top, or side of the pusher assembly track 1108.

The pusher assembly is configured such that the reed switch 1112 is activated when the magnet 1110 is aligned overhead, such as when the pusher assembly is void of product. When the magnetic reed switch 1112 is activated and closed, a signal is transmitted to an RFID component 1114 positioned outside of the product environment. Because the RFID component 1114 is located outside of the product environment 1102, the RFID component 1114 is able to transmit while avoiding interference present inside of the product environment 1102. In FIG. 11, the pushing element is in a first position, where the magnet 1110 and reed switch 1112 are not aligned, and the RFID component 1114 is in a dormant state. FIG. 12 depicts the pusher assembly in a second position where the magnet 1110 and the reed switch 1112 are aligned, wherein the closed reed switch 1112 activates the RFID component 1114 to transmit data (e.g., pusher identification data, stock level data) when the pusher assembly holds no units of product.

An RFID component, such as the RFID component depicted in FIGS. 11 and 12, may be associated with a single product display alert system (e.g., one pusher assembly) or may be multiplexed to multiple product display alert systems. In some implementations, the inclusion of RFID signal transmitting hardware for each product display alert system may become redundant. Thus, costs may be reduced by routing product level tracking signals for multiple product display alert systems through a signal RFID component.

Figure 13:
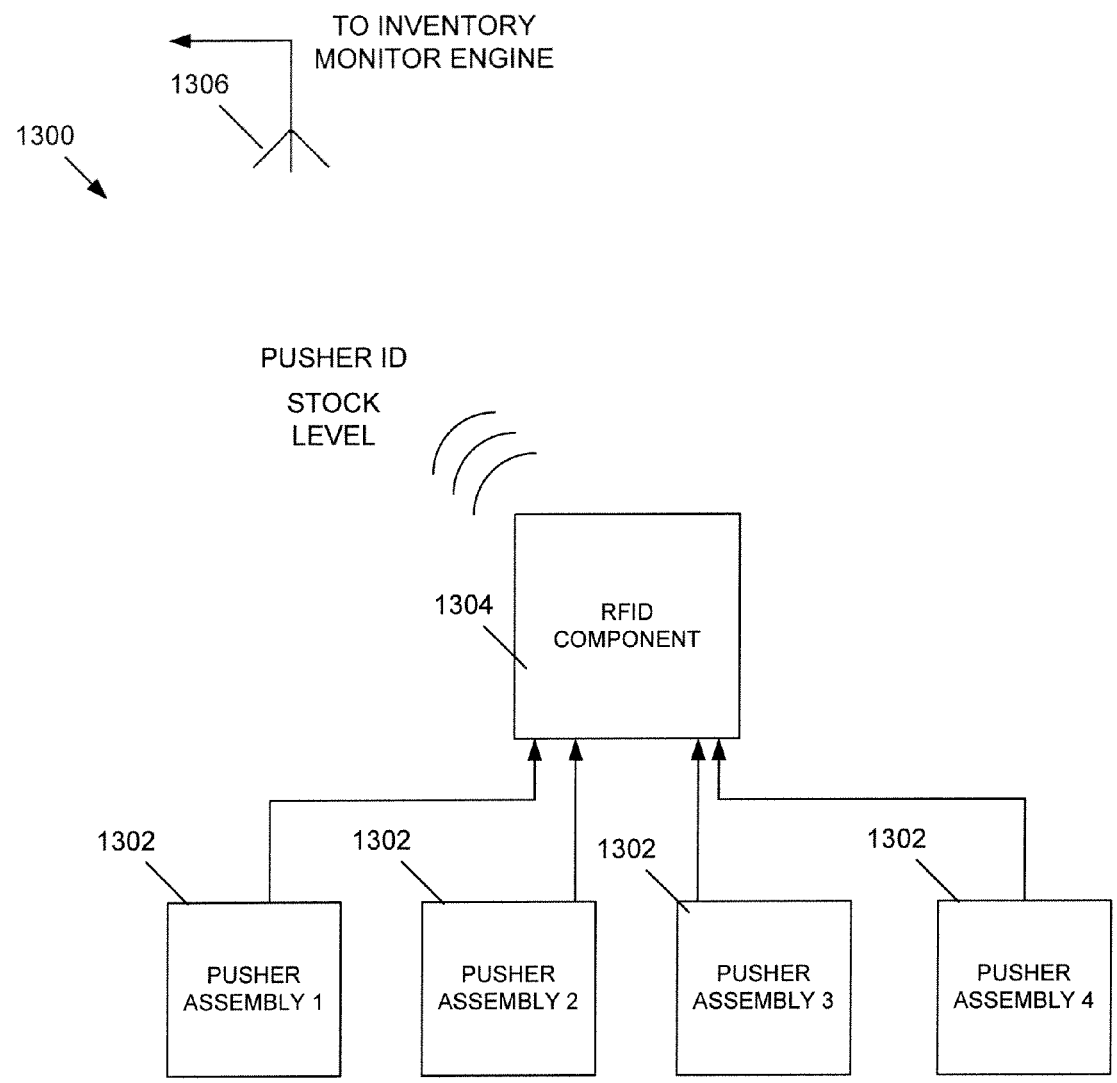
FIG. 13 is a block diagram depicting a multiplexed RFID component configuration.

FIG. 13 is a block diagram depicting a multiplexed RFID component configuration. The configuration includes a plurality of pusher assemblies 1302. Each of the pusher assemblies 1302 includes a mechanism for tracking an amount of product present in that pusher assembly 1302. When a pusher assembly 1302 reaches a tracking point where a signal is to be transmitted to the inventory monitor engine, the pusher assembly 1302 provides a signal to the RFID component 1304. The signal from the pusher assembly 1302 to the RFID component 1304 may include an identification of the particular pusher assembly 1302 requesting the transmission with an identification of a stock level to be identified as being present in the pusher assembly 1302. The RFID component 1304 relays the signal received from the pusher assembly 1302 or a processed version of the data received from the pusher assembly 1302 to an antenna 1306 that forwards the received data to the inventory monitor engine.

A multiplexed RFID component configuration may be useful in a variety of applications. For example, a multiplexed component configuration could be used in the example of FIGS. 11 and 12, where the RFID component 1114 is physically separate from the pusher assembly. Because some wiring is necessary to connect the reed switch 1112 to the RFID component 1114, little extra installation work is necessary to connect multiple reed switches 1112 to a multiplexed RFID component 1114.

As another example, a multiplexed implementation can be incorporated into shelf units for ease in installation, where multiple pusher assemblies 1302 are attached to a shelf and connected to a multiplexed RFID component 1304. The shelf can be installed, moved, and removed as appropriate without a requirement for additional configuration of the product display alert system tracking system.

As another example, a multiplexed configuration may also be useful in applications where the product display alert systems are small and not amenable to the incorporation of RFID transmission hardware. For example, product display alert systems may be incorporated into a lipstick dispensing display at a department store. An activation element may be incorporated into each dispensing element of the display. However, the incorporation of RFID transmission hardware into each dispensing element may introduce difficulties in both installation time and cost. By multiplexing the outputs of several of the dispensing element activation elements to a single RFID component, significant time, space, and hardware cost savings may be realized.

The magnet implementation for activating the RFID component may be implemented in a variety of ways. One magnetic system employs a reed switch. A reed switch includes a small, sealed device containing two flexible magnetizable contacts, which are normally not in contact with one another. In the presence of a magnetic field, the contacts become magnetized by induction and can attract one another, causing them to close. Such a switch may be incorporated by placing the switch on the RFID component tag and wiring it in series with the battery of a battery-assisted tag. The RFID component is placed on the pushing element, and a small permanent magnet is placed on a fixed part of the pusher assembly track in such a location that the magnet will trigger the reed switch at the alert point, allowing the RFID component to receive battery power and to be read by a reader. With a small cover over the tag and switch on the paddle extender, monitoring becomes very robust and inconspicuous. A magnet-switch implementation can also be utilized for either passive or battery-assisted passive EPC tags with slight modification.

Another magnetic approach that can be utilized uses a Hall-effect device. A Hall-effect device is a small device that detects the magnitude of the magnetic field in its vicinity. The device requires a small bias current, and the device is sensitive to stray magnetic fields, including that of the earth itself. Such a configuration can utilize a battery-assisted tag with a large enough battery to supply the extra energy required to run the Hall-effect device for the required life of the tag on the pusher.

In addition to the magnet/reed switch activation element configurations described above, many other mechanisms can be used for activating an RFID component for transmission of product level data. For example, in a direct/indirect contact implementation, a pushing element travels either directly over a set of contacts (direct) or pushes an apparatus connected to a switch, such as a microswitch (indirect). In the direct case, the pushing element trails two contacts which normally rest on the plastic of the pusher track, which is non-conducting. Under this condition, the RFID reader receives no response from the RFID component attached to the pusher. When the slider reaches an alert point, the contacts move onto a conducting section, such as a piece of metal or metalized tape. This contact connects the two contacts and causes the RFID component to enter an active mode where the RFID component can be read by an RFID reader or antenna. In a similar fashion, an indirect switch can be closed when the pushing element moves into the appropriate position.

In another example, a tilt-switch can provide the benefits of the direct/indirect contact mentioned above. There are two common types of tilt switch. In one, a small conductive sphere is contained in a chamber which has two contacts at one end. These contacts are spaced apart less than the diameter of the sphere, such that if the sphere contacts them, it will complete a circuit between the two contacts. The chamber is mounted on a pivot, so that the sphere rolls to one end or the other as the moving part of the pusher encounters some sort of mechanical trip. When the pushing element is in the non-alerting condition, the chamber is tilted such that the sphere is in the end away from the contacts. When the pushing element reaches the alert trip point, the chamber tilts and the sphere rolls to the other end, completing the circuit and allowing the RFID component to start alerting. In another kind of tilt switch, the sphere is replaced by a small droplet of mercury. The mercury can roll to the contact end of the chamber and complete the circuit.

As a further example, optical means of triggering the RFID component into alert mode may be utilized. One implementation uses an opto-interrupter, which consists of an integrated LED and photodiode. A small physical gap is left between the LED and photodiode so that a blade or shutter can interrupt the light going from the LED to the photodiode, allowing the device to be used as a position sensor. The opto-interrupter can be wired to a pin on the RFID component, and a small blade can be fixed to the pushing element. When the RFID component moves such that the blade is in the opto-interrupter, the RFID component is triggered into alerting mode.

In another example, a change in capacitance can be used to trigger the RFID component. A capacitor can have two isolated plates on the moving part and one larger plate on the fixed part of the pusher assembly. Capacitance is measured between the two smaller plates. When the sliding part is far from the larger fixed plate, there is only a small capacitance between the edges of the two small plates. When the sliding part moves such that the bigger plate covers the two smaller ones, the capacitance between these two plates increases significantly. Capacitance can be measured by a variety of means. One method incorporates a large resistor in series with the two plates with the common point connected to a pin on the RFID component. The resistor voltage is set from low to high, causing the capacitor to begin to charge. At the same time a timer is started. When the pin connected to the common point changes state, the timer is read. A high value on this counter indicates a high capacitance. Capacitance change can also be used to change the resonant frequency of a tuned circuit or oscillator, and this can be translated into detection of position.

As a further example, resistors can be used in the direct contact method described above to indicate several positions along the track. Resistors of different values are connected to pairs of contacts in such a way that as the moving part of the pusher is above them, the RFID component senses current flow through the resistor. The value of the resistor is measured, and the measured value can identify how far along the track the pushing element has moved.

Figure 14:
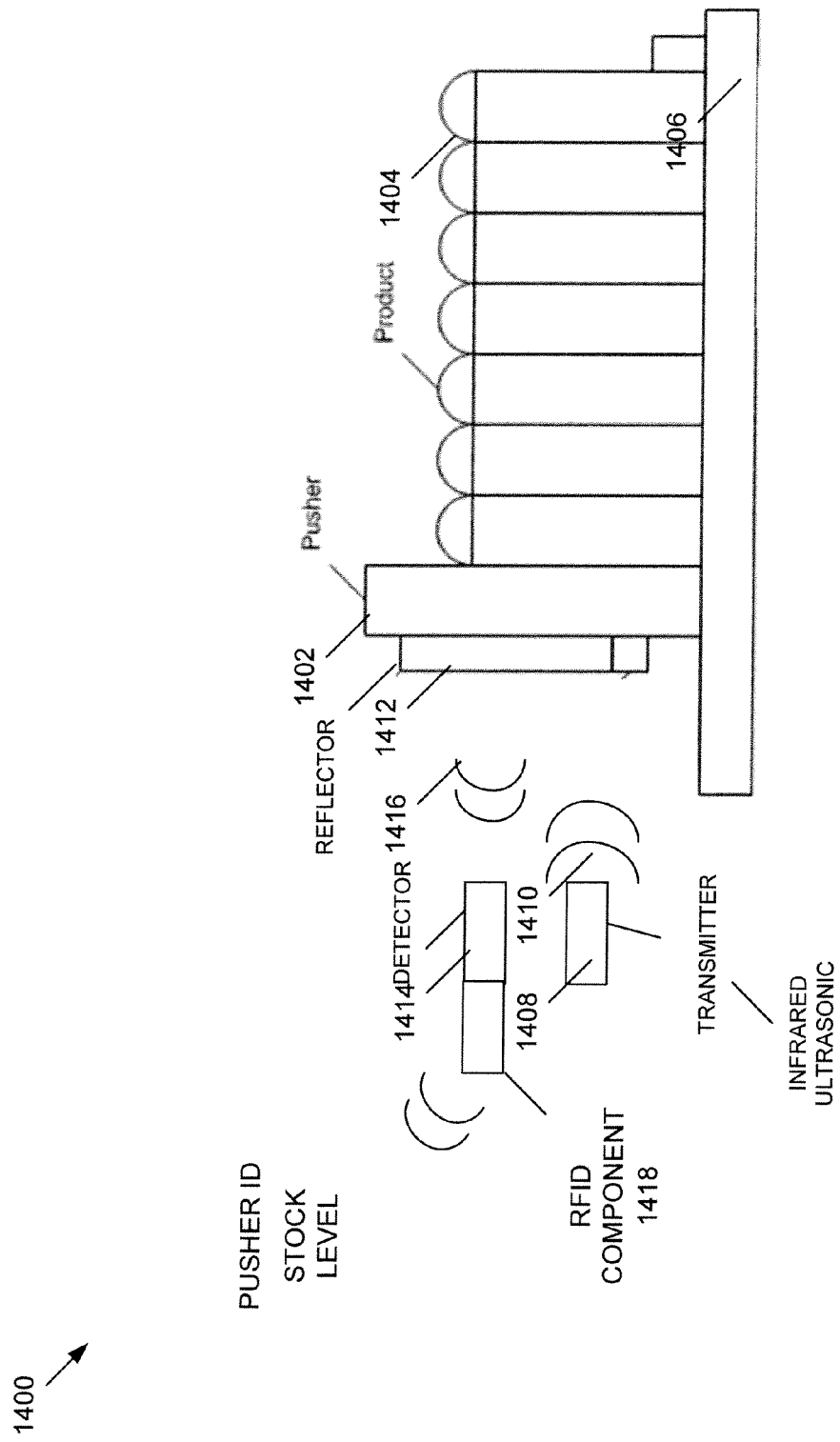
FIG. 14 depicts an infrared sensor product display alert system.

As a further example, FIG. 14 depicts an infrared/ultrasonic sensor product display alert system. A pushing element 1402 pushes units of product 1404 towards the front portion 1406 of a shelf as units of the product are removed from a pusher assembly. An infrared or ultrasonic transmitter 1408 transmits waves 1410 that are bounced off of a reflector 1412 that is positioned at the back of the pushing element 1402. A detector 1414 outputs a DC voltage proportional to the strength of received infrared or ultrasonic waves 1416. The analog voltage is sampled by an A/D converter, and a distance from the transmitter 1408 to the reflector 1412 can be computed. The computed distance can be translated into an amount of product remaining in the pusher assembly. An RFID component 1418 transmits a pusher assembly identification value along with a stock level to an inventory monitor engine.

Figure 15:
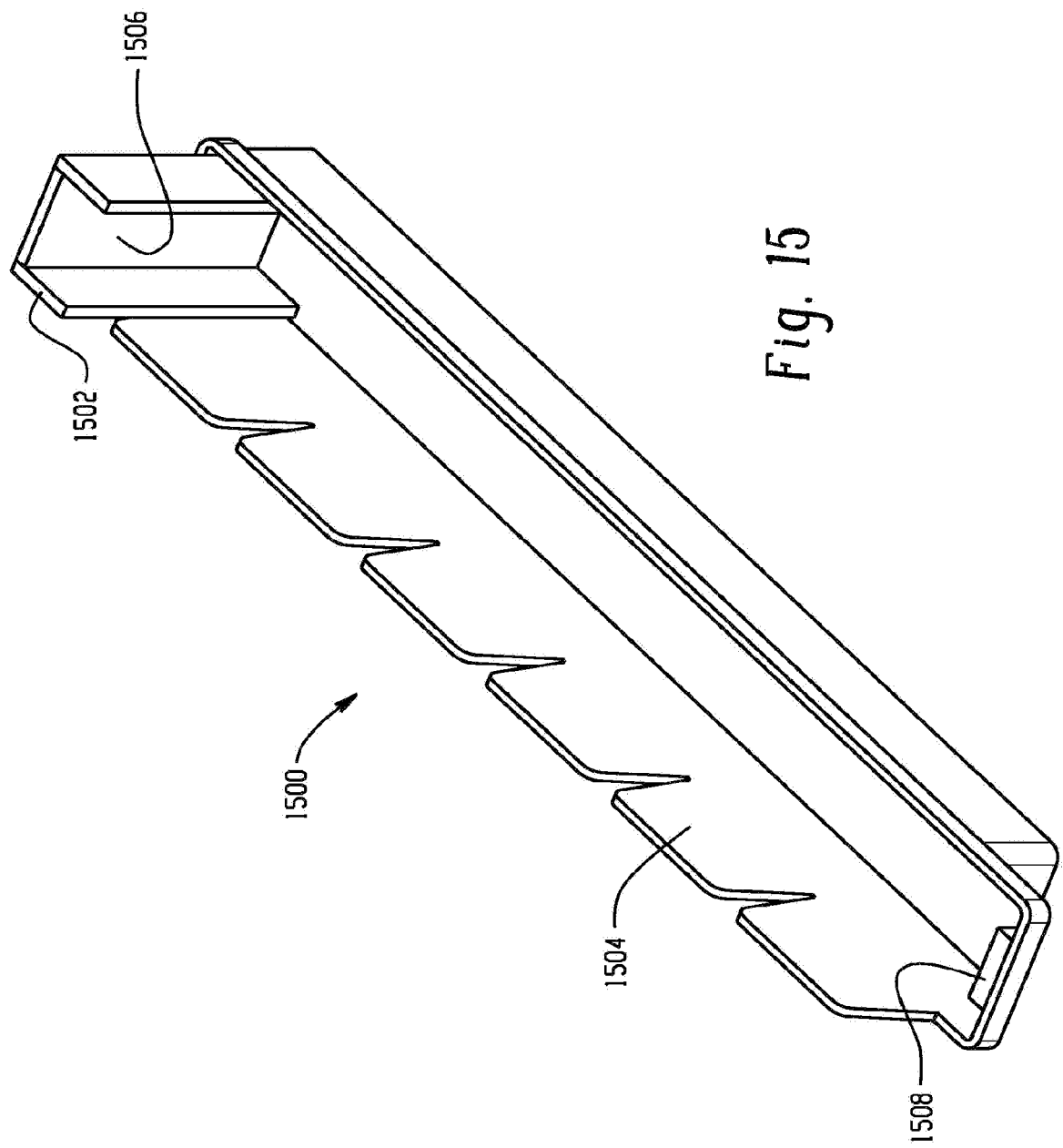
FIG. 15 depicts an example infrared sensor product display alert system.

FIG. 15 depicts an example infrared sensor product display alert system. A pushing element 1502 pushes product along a track 1504 that includes a reflector 1506 for reflecting infrared waves transmitted by a transmitter/receiver 1508. Based on a strength of reflected signal detected by the transmitter/receiver 1508, a distance between the transmitter/receiver 1508 and the pushing element 1502 is calculated and an amount of product in the pusher assembly is derived. Alerts may be periodically transmitted to inventory monitor engine, informing the engine of the amount of product remaining in the pusher assembly. Alerts may also be sent when at alert points, such as when the pusher assembly is half full and empty.

Figure 16:
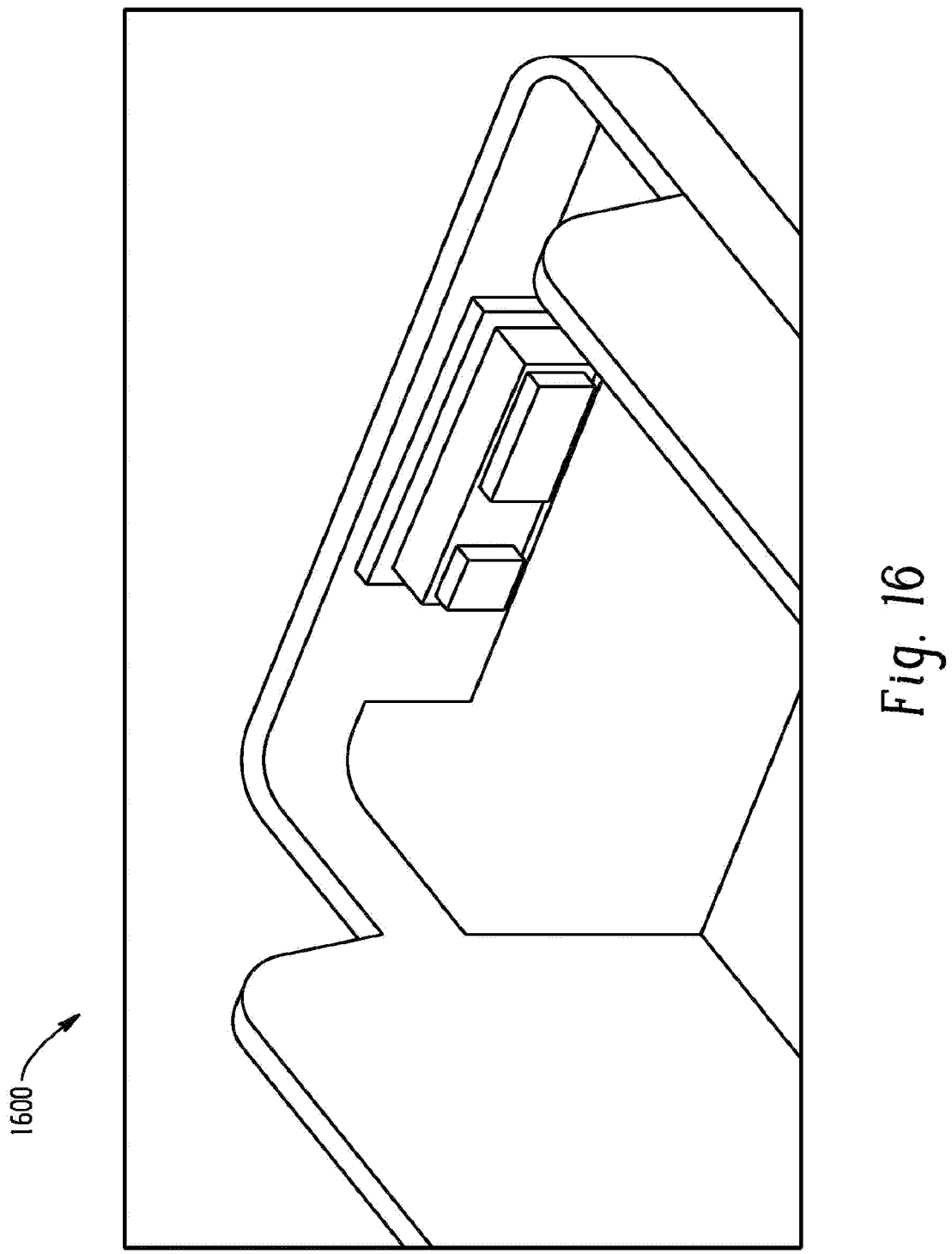
FIG. 16 depicts a close up view of an infrared sensor product display transmitter/receiver.

FIG. 16 depicts a close up view of an infrared sensor product display transmitter/receiver. Several different transmitters and receivers may be utilized in an infrared sensor product display. In the example of FIG. 16, a Sharp Electronics GP2D12 is used as the transmitter/receiver.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

This written description uses examples to disclose the invention, including the best mode, and also to enable a person skilled in the art to make and use the invention. The patentable scope of the invention may include other examples that occur to those skilled in the art.

It is claimed:

1. A low stock product display alert system, comprising:
   a pushing element configured to push one or more products toward a front of a shelf as a unit of the product is removed from the shelf;
   an RFID component, wherein the RFID component is configured to be in a dormant state when the pushing element is in a first position;
   a switch activation element configured to activate the RFID component from a non-transmitting state by closing a circuit when the pushing element is in a second position, wherein when activated, the RFID component is configured to emit a signal indicating that the product display is in the low stock state.

2. The system of claim 1, wherein the RFID component is a battery-assisted RFID tag, wherein when the circuit is closed the RFID component is activated by receiving battery power.

3. The system of claim 1, wherein the pushing element is configured to push one or more products toward the front of the shelf along a track.

4. The system of claim 2, wherein the RFID component is affixed to the pushing element, wherein the activation element is affixed to a front portion of the track.

5. The system of claim 4, wherein the pushing element is in the second position when the RFID component is aligned with the activation element at the front portion of the track.

6. The system of claim 1, wherein the RFID component is activated via a closed magnetic reed switch, wherein the activation element is a magnet, wherein the magnetic reed switch is closed and the RFID component is activated when the RFID component is aligned with the magnet at a front portion of the track.

7. The system of claim 3, wherein the RFID component is affixed to a front portion of the track, wherein the activation element is affixed to the pushing element.

8. The system of claim 1, further comprising a plurality of the RFID components, and an RFID reader, the plurality of RFID components configured to emit a low stock alert signal to be read by the same RFID reader, the low stock alert signal also identifying the activated RFID component.

9. The system of claim 7, wherein the plurality of RFID components are each associated with a pushing element and the same RFID reader detects low stock alert signals from the plurality of RFID components.

10. The system of claim 8, further comprising a plurality of shelving units, wherein each of the plurality of shelving units includes at least one of the plurality of RFID components and the associated pushing element.

11. The system of claim 9, wherein the RFID reader detects the low stock alert signals of all the plurality of RFID components in a retail store.

12. The system of claim 9, wherein the shelving units comprise metal.

13. The system of claim 1, wherein the RFID component is responsive to multiple pushing elements, wherein the RFID component transmits an out-of-product signal that identifies a particular one of the multiple pushing elements when the particular pushing element is in the second position.

14. The system of claim 1, wherein the pushing element is located within a refrigerator, and wherein the RFID component is located outside of the refrigerator, wherein the RFID component transmits an out-of-product signal to an antenna located outside of the refrigerator when the pushing element is in the second position.

15. The system of claim 1, wherein the pushing element is located within a refrigerator, and wherein the RFID component is located within the refrigerator, wherein the RFID component transmits an out-of-product signal to an antenna when the pushing element is in the second position.

16. The system of claim 1, wherein the RFID component is selected from a passive tag, a battery assisted tag, or an active tag.

17. A method of providing a product stock alert, comprising:
   receiving product in a pusher assembly, wherein the pusher assembly includes a pushing element configured to push one or more products toward a front of a shelf along a track as a unit of product is removed from the shelf;
   activating an RFID component when the pushing element is in an activate position, wherein when activated, the RFID component is configured to emit a signal indicating that the pusher assembly is out of product, and wherein the RFID component is inactive when the pusher assembly is in an inactive position;
   wherein the RFID component is activated from a dormant, non-transmitting state, to an active, transmitting state;
   wherein the pushing element is in an activate position based on the location of the RFID component in relation to the activation element.

18. The method of claim 15, wherein the activation element is a magnet.

19. The method of claim 15, wherein a plurality of the RFID components emit a low stock alert signal to be read by a same RFID reader.

20. A low stock product display alert system, comprising:
   a plurality of pushing elements configured to push one or more products toward a front of a shelf as a unit of the product is removed from the shelf;
   a plurality of RFID components each configured to be in a dormant state when the pushing element is in a first position;
   an activation element configured to activate the RFID component when the pushing element is in a second position, wherein when activated, the RFID component is configured to emit a low-stock signal; and
   an RFID reader;
   the RFID reader configured to receive a low-stock alert signal from each of the plurality of RFID components when each of the plurality of RFID components are activated.

21. The low stock alert system of claim 19, wherein at least one of the plurality of RFID components is responsive to multiple pushing elements, wherein the RFID component transmits a low-stock signal that identifies a particular one of the multiple pushing elements when the particular pushing element is in the second position.

22. The low stock alert system of claim 19, further comprising a plurality of shelving units, wherein each of the plurality of shelving units includes at least one of the plurality of RFID components and associated pushing elements.

* * * * *